United States Patent Office 3,331,811
Patented July 18, 1967

3,331,811
STABILIZED TRIFLUOROCHLOROETHYLENE POLYMERS CONTAINING (A) ZINC OXIDE AND (B) HYDROQUINONE OR CHLORANIL
Joseph L. Schafer, New York, N.Y., assignor to Allied Chemical Corporation, New York, N.Y., a corporation of New York
No Drawing. Filed May 18, 1964, Ser. No. 368,323
7 Claims. (Cl. 260—45.75)

This invention relates to the stabilization of trifluorochloroethylene polymers and, more particularly, to a process for stabilizing trifluorochloroethylene polymers against degradation during fabrication thereof.

Trifluorochloroethylene polymers exhibit outstanding mechanical, electrical and chemical properties at high temperatures. For example, polytrifluorochloroethylene exhibits chemical resistance to oxidizing and reducing materials such as fuming nitric acid, fuming sulfuric acid, chlorosulfonic acid, hydrogen peroxide, 50% aqueous sodium hydroxide solution, etc. The polymer also possesses high tensile strength and heat stability. These polymers are molded into useful articles such as valves or gaskets or are extruded into sheets which may be employed as pipe and valve linings.

When trifluorochloroethylene polymers are heated to fabrication temperatures, degradation of the polymer occurs which results in lowering of the molecular weight of the polymer and embrittlement after heat aging. In particular, degradation of molecular weight occurs during extrusion and injection molding operations.

Various stabilizers have been proposed to retard degradation of trifluorochloroethylene polymers at high temperatures. For example, zinc oxide, when employed in amount below 1% by weight of the polymer, does not provide adequate stabilization of the polymers. When zinc oxide is employed in larger amount, white and completely opaque polymers having inferior tensile strength and electrical properties are obtained.

In the case of a stabilizer such as hydroquinone or chloranil, use of the stabilizer in amount below 0.5% by weight of the polymer does not provide adequate stabilization of the polymer. When employed in larger amounts, the stabilizer causes the formation of bubbles in the polymer.

An object of the present invention is to provide a process for improving the thermal stability of polymers of trifluorochloroethylene.

Another object of the invention is to provide compositions comprising trifluorochloroethylene polymers and stabilizers therefor.

Other objects and advantages will become apparent to those skilled in the art from the following description and disclosure.

In accordance with the present invention, the thermal stability of trifluorochloroethylene polymers is improved by intimately dispersing within the polymer a stabilizing mixture comprising 0.01 to 1% by weight of the polymer of zinc oxide and 0.01 to 1% by weight of the polymer of a member of the group consisting of hydroquinone and chloranil.

Although, as indicated above, each component of the stabilizing mixture by itself fails to effect satisfactory stabilization of trifluorochloroethylene polymers, the mixture surprisingly effects excellent stabilization of the polymers against thermal degradation. This is illustrated by the maintenance of a high ZST (zero strength time) value when the polymers are exposed to thermal stresses during fabrication. Moreover, the stabilizing mixtures of this invention do not adversely affect the physical and electrical properties of the polymers.

The ZST test provides a rapid and reliable method for determining the apparent molecular weight of trifluorochloroethylene polymers. The test measures the time required to break a standard notched strip of heated polymer which is weighted with a small static load, as described in Modern Plastics, October 1954, page 146. Acceptable minimum ZST values of the trifluorochloroethylene polymers range from 180 to 200.

The trifluorochloroethylene polymers which may be stabilized in accordance with this invention are high molecular weight, normally solid thermoplastic polymers having a ZST of at least 200 and preferably above 220. They include the homopolymer of trifluorochloroethylene, as well as interpolymers of trifluorochloroethylene with other fluoroethylene monomers such as vinylidene fluoride, tetrafluoroethylene, etc., containing above 95 weight percent of trifluorochloroethylene. These polymers may be prepared by processes well known to those skilled in the art.

Although each of the zinc oxide and hydroquinone or chloranil may be employed in amount of 0.01 to 1% by weight of the polymer, it is preferred to employ 0.02 to 0.25% of each ingredient. When the stabilizing mixture contains chloranil, it is desirable to use at least 0.05% by weight thereof with respect to the polymer. It is understood, of course, that the exact concentration of the stabilizing mixture in the polymer is determined by the use for which the polymer is intended, as well as by the degree of stabilization desired.

Admixing of the stabilizers with the polymer may be effected by conventional mechanical procedures. If the polymer is in powder form, conventional tumbling or blending devices may be used. For molding operations such as extrusion or injection molding, the blended mixture may be passed through an extruder and the extruded rod chopped into pellets of desired size. Alternatively, the stabilizers may be admixed with the polymer by tumbling pellets of the polymer with polytrifluorochloroethylene oil, adding the stabilizers, tumbling again to distribute the stabilizers evenly over the surface of the pellets and extruding the resultant mixture to intimately blend the polymer and stabilizers. To minimize polymer degradation the blended mixture is maintained at the lowest possible melt temperature during extrusion.

The following examples illustrate the outstanding stabilization achieved by the stabilizing mixtures of the present invention. In the examples, the designation "N.G." indicates unacceptable product.

EXAMPLE 1

Pellets of an interpolymer containing 96 weight percent trifluorochloroethylene, 3 weight percent tetrafluoroethylene and 1 weight percent vinylidene fluoride stabilized with 0.1% by weight of zinc oxide and 0.06% by weight of chloranil were prepared by extruding interpolymer powder admixed with the stabilizing ingredients through a 3½" diameter, 36:1 length-to-diameter Prodex extruder at a melt temperature of about 500° F., chopping the extruded rod to pellets and drying the pellets. These pellets, before and after subsequent process extrusion, were molded at 500° F. by ASTM Method D–1430–58T to sheets 5" diameter and 0.062±0.003" thick. Some of the sheets were permitted to cool in ambient air to produce crystalline sheets which were tested for ultimate tensile strength and ultimate tensile elongation properties. Other sheets were quenched in cold water to produce amorphous sheets for ZST determination. Similar sheets were prepared, before and after subsequent process extrusion, from pellets of the unstabilized interpolymer.

The procedure for process extrusion involved use of a 1¾" Prodex extruder with a length-to-diameter ratio of 20:1. The conditions used were 33 r.p.m. on the extruder screw which was the lowest rate attainable, and such barrel and die temperatures as to give a ⅜″ rod capable of being drawn to about ⅛″ diameter without breaking at melt temperatures of 633–644° F. The ⅜″ rod was drawn in a water trough to about 0.10–0.12″ diameter, chopped to pellets and the pellets dried.

The following properties of the sheets were observed.

| Property | Unstabilized Interpolymer | | Stabilized Interpolymer | |
|---|---|---|---|---|
| | Original | After Process Extrusion | Original | After Process Extrusion |
| ZST, seconds | 227 | 113 (N.G.) | 254 | 205 |
| Ultimate tensile strength, p.s.i. (ASTM D–1708–59T) | 5,460 | 5,940 | 5,450 | 5,670 |
| Ultimate tensile elongation, percent (ASTM D–1708–59T) | 120 | 50 | 150 | 20 |

Heat aging of the sheets was effected by placing the sheets on shelves lined with aluminum foil in a circulating air oven maintained at 340°±2° F. for 50 days. The following properties were observed:

PROPERTIES AFTER PROCESS EXTRUSION AND HEAT AGING

| Property | Unstabilized Interpolymer | | Stabilized Interpolymer | |
|---|---|---|---|---|
| | After Process Extrusion | After Process Extrusion and Heat Aging | After Process Extrusion | After Process Extrusion and Heat Aging |
| ZST, seconds | 113 (N.G.) | 106 (N.G.) | 205 | 213 |
| Ultimate tensile strength, p.s.i. | 5,940 | 5,290 | 5,670 | 5,450 |
| Ultimate tensile elongation, percent | 50 | <5 (N.G.) | 20 | 35 |

EXAMPLE 2

Pellets prepared as described in Example 1 were subjected to extreme melt temperatures of 633–644° F. during standard thermoplastic extrusion runs. The following results were obtained:

| Sample | ZST, Seconds | | |
|---|---|---|---|
| | Original | After 1 Pass | After 2 Passes |
| Unstabilized | 227 | 113 (N.G.) | 96 (N.G.) |
| Stabilized | 254 | 205 | 179 |

EXAMPLE 3

The unstabilized and stabilized interpolymers described in Example 1 were extruded into pellets at a melt temperature of 633–644° F. and re-extruded twice more. When the unstabilized pellets were molded into sheets at 500° F. and quenched in cold water, fairly flexible sheets were obtained. When, however, these sheets were heat aged at 374° F. for 49 hours, very brittle, unacceptable sheets were obtained. On the other hand, when the stabilized pellets were molded into sheets at 500° F., quenched in cold water and heat aged at 374° F. for 49 hours, outstandingly tough and flexible sheets were obtained.

EXAMPLE 4

Trifluorochloroethylene polymers containing stabilizers were prepared by the following general procedure:

Three kilograms of pellets composed of polymers of trifluorochloroethylene were tumbled in a glass jar with an aluminum foil cap liner for 15 minutes with six grams of polytrifluorochloroethylene oil to wet the surface of the pellets. After the tumbling operation, stabilizer was added. The pellets were tumbled for another 15 minutes to distribute the stabilizer over the surface of the pellets. The coated pellets were then extruded at the indicated melt temperature. Sheets were made from the pellets of the stabilizer-containing polymers and from pellets of unstabilized polymers, as described in Example 1.

The following properties of the sheets were observed:

Interpolymer containing 96 weight percent trifluorochloroethylene, 3 weight percent tetrafluoroethylene and 1 weight percent vinylidene fluoride

| Composition, Percent | | Melt Temperature, ° C. | ZST, Seconds | |
|---|---|---|---|---|
| Zinc Oxide | Hydroquinone | | Original | After Extrusion |
| | | 307 | 344 | 161 (N.G.) |
| 0.05 | | 311 | 344 | 162 (N.G.) |
| | 0.025 | 313 | 344 | 163 (N.G.) |
| 0.05 | 0.025 | 320 | 344 | 240 |
| 0.02 | 0.02 | 323 | 229 | 192 |
| 0.05 | 0.05 | 323 | 229 | 197 |

Copolymer of 96 weight percent trifluorochloroethylene and 4 weight percent vinylidene fluoride

| Composition, Percent | | Melt Temperature, ° C. | ZST, Seconds | |
|---|---|---|---|---|
| Zinc Oxide | Hydroquinone | | Original | After Extrusion |
| | | 304 | 296 | 160 (N.G.) |
| 0.02 | | 311 | 296 | 151 (N.G.) |
| | 0.02 | 316 | 296 | 152 (N.G.) |
| 0.02 | 0.02 | 319 | 296 | 221 |

It is seen from the above results that the trifluorochloroethylene polymers were not effectively stabilized by use of zinc oxide or hydroquinone alone.

EXAMPLE 5

Pellets of interpolymers containing 96 weight percent trifluorochloroethylene, 3 weight percent tetrafluoroethylene and 1 weight percent vinylidene fluoride were admixed with stabilizers, as described in Example 4, extruded at the lowest possible melt temperature and then re-extruded at a melt temperature of 334–338° C. Amorphous sheets were prepared from the pellets before and after the second extrusion, as well as from pellets of unstabilized interpolymer, as described in Example 1. The sheets had the following ZST values:

| Run | Composition, Percent | | ZST, Seconds | |
|---|---|---|---|---|
| | Zinc Oxide | Chloranil | Original | After Re-extrusion |
| 1 | | | 230 | 126 (N.G.) |
| 2 | 0.3 | | 181 | 131 (N.G.) |
| 3 | | 0.23 | 211 | 156 (N.G.) |
| 4 | | 0.7 | 215 | [1] 189 |
| 5 | 0.02 | 0.05 | 228 | 200 |
| 6 | 0.1 | 0.23 | 248 | 220 |
| 7 | 0.06 | 0.05 | 236 | 217 |
| 8 | 0.3 | 0.23 | 237 | 220 |
| 9 | 0.02 | 0.14 | 239 | 209 |
| 10 | 0.1 | 0.7 | 218 | 208 |

[1] Bubbling occurred.

The above results show that the trifluorochloroethylene interpolymers were not effectively stabilized by use of zinc oxide or chloranil alone.

EXAMPLE 6

Pellets of trifluorochloroethylene polymers were tumbled for 10–15 minutes with 0.2% of their weight of polytrifluorochloroethylene oil. Stabilizer was then added and tumbling was continued for another 10–15 minutes. The coated pellets were extruded using a 1½″ Davis-Standard extruder having a length-to-diameter ratio of 20:1 at the lowest possible melt temperature in order to disperse the stabilizer in the polymer. The pellets so prepared were then re-extruded at higher temperatures and at lower through-put rates than before. The conditions selected for the re-extrusion would degrade standard unstabilized trifluorochloroethylene polymers to low molecular weight materials. The above ZST values to amorphous sheets prepared, as described in Example 1, from the pellets of the stabilizer-containing polymers and from pellets of unstabilized polymers were obtained.

Mechanical and electrical properties of molded parts prepared from the stabilized trifluorochloroethylene polymers of this invention, including dielectric constant and dissipation factor, were not adversely affected even after 50 days heat aging at 340° F. in the case of both the original stabilized polymers and the stabilized polymers after process extrusion.

Although certain preferred embodiments of the invention have been disclosed for purposes of illustration, it will be evident that various changes and modifications may be made therein without departing from the scope and spirit of the invention.

I claim:

1. A polymer composition having improved thermal stability which comprises an admixture of a polymer of trifluorochloroethylene and 0.02 to 1% by weight of the polymer of each of zinc oxide and a member selected from the group consisting of hydroquinone and chloranil.

2. The composition of claim 1 wherein the polymer is a copolymer of trifluorochloroethylene and vinylidene fluoride containing above 95 weight percent of trifluorochloroethylene.

3. The composition of claim 1 wherein the polymer is an interpolymer of trifluorochloroethylene, tetrafluoroethylene and vinylidene fluoride containing above 95 weight percent of trifluorochloroethylene.

4. The composition of claim 1 wherein the polymer is trifluorochloroethylene homopolymer.

5. The composition of claim 1 wherein the stabilizing mixture is composed of zinc oxide and hydroquinone.

6. The composition of claim 1 wherein the stabilizing mixture is composed of zinc oxide and chloranil.

7. The composition of claim 1 wherein each ingredient of the stabilizing mixture constitutes 0.02 to 0.25% by weight of the polymer.

| Sample | Stabilizer | | | ZST, Seconds | |
|---|---|---|---|---|---|
| | Percent Zinc Oxide | Percent Hydroquinone | Percent Chloranil | Original | After Re-extrusion |
| A | | | | 215 | 111 (N.G.) |
| A | 0.05 | | 0.1 | 239 | 228 |
| B | | | | 193 | 89 (N.G.) |
| B | 0.05 | | | 260 | 135 (N.G.) |
| B | | | 0.1 | 212 | 138 (N.G.) |
| B | 0.05 | | 0.1 | 245 | 272 |
| C | | | | 279 | 112 (N.G.) |
| C | 0.05 | | | 203 | 113 (N.G.) |
| C | | 0.05 | | 340 | 142 (N.G.) |
| C | 0.05 | 0.05 | | 384 | 281 |
| C | | | 0.1 | 324 | 113 (N.G.) |
| C | 0.05 | | 0.1 | 400 | 254 |

A = Interpolymer containing 96 weight percent trifluorochloroethylene, 3 weight percent tetrafluoroethylene and 1 weight percent vinylidene fluoride.
B = Copolymer of 96 weight percent trifluorochloroethylene and 4 weight percent vinylidene fluoride.
C = Homopolymer of trifluorochloroethylene.

References Cited

UNITED STATES PATENTS 2,907,742   10/1959   Frey et al. _____ 260—45.7
2,985,620   5/1961    Honn _____ 260—45.75

DONALD E. CZAJA, *Primary Examiner.*

L. BERCOVITZ, *Examiner.*

G. W. RAUCHFUSS, V. P. HOKE,
*Assistant Examiners.*